United States Patent
Lundstrom

(10) Patent No.: US 7,623,498 B2
(45) Date of Patent: Nov. 24, 2009

(54) CHARGE ADVICE IN TELECOMMUNICATION SYSTEMS

(75) Inventor: Johan Lundstrom, Pargas (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 910 days.

(21) Appl. No.: 10/451,837

(22) PCT Filed: Dec. 17, 2001

(86) PCT No.: PCT/EP01/15051

§ 371 (c)(1),
(2), (4) Date: Jun. 25, 2003

(87) PCT Pub. No.: WO02/054672

PCT Pub. Date: Jul. 11, 2002

(65) Prior Publication Data

US 2004/0052225 A1    Mar. 18, 2004

(30) Foreign Application Priority Data

Dec. 29, 2000  (GB) ................... 0031769.3

(51) Int. Cl.
*H04M 15/00* (2006.01)

(52) U.S. Cl. .................... 370/338; 455/408; 379/114.01

(58) Field of Classification Search .................. 370/338, 370/329; 455/405–409, 433; 379/112.07, 379/112.08, 114.01–114.03, 114.06–114.1, 379/114.17, 114.21, 114.23, 114.26, 114.28, 379/114.29, 115.01–115.03, 118, 120, 121.01, 379/121.06, 127.01, 127.03, 127.06, 130, 379/133, 134

See application file for complete search history.

(56) References Cited

U.S. PATENT DOCUMENTS

| 5,481,534 | A  | * | 1/1996  | Beachy et al.    | 370/259  |
| 6,378,130 | B1 | * | 4/2002  | Adams            | 725/95   |
| 6,463,275 | B1 | * | 10/2002 | Deakin           | 455/406  |
| 6,480,472 | B1 | * | 11/2002 | Jou et al.       | 370/252  |
| 6,724,748 | B1 | * | 4/2004  | Stille et al.    | 370/352  |
| 7,010,103 | B2 | * | 3/2006  | Donovan          | 379/114.2|

FOREIGN PATENT DOCUMENTS

| WO | WO 99/60801      | 11/1999 |
| WO | WO 00/69201      | 11/2000 |
| WO | WO 00/69201 A1 * | 11/2000 |

* cited by examiner

*Primary Examiner*—Seema S Rao
*Assistant Examiner*—Mon Cheri S Davenport
(74) *Attorney, Agent, or Firm*—Roger S. Burleigh

(57) ABSTRACT

A method of providing charge information to a user of a mobile terminal (2), which information relates to an IP connection or connections being used by the user. The method comprises the steps of identifying the terminal (2) or the user to a charge control node (CCN) (10) located in a home network (1) of the terminal (2) or user and, for the duration of the IP connection(s), using the existing connection or one of the existing connections to transport a stream of charge information messages from the CCN (10) to the mobile terminal (2).

14 Claims, 2 Drawing Sheets

CHARGE ADVICE IN TELECOMMUNICATION SYSTEMS

FIELD OF THE INVENTION

The present invention relates to charge advice in telecommunication systems and in particular though not necessarily to a method and apparatus for providing charge advice to mobile terminal users.

BACKGROUND TO THE INVENTION

In today's mobile telecommunication networks, the operator of a mobile network is able to maintain tight control over the calls made and services used by its subscribers when they are at home, i.e. when they are registered with the operator's own network. For example, if a subscriber exceeds his calling credit limit the operator can notify the subscriber of this situation and/or can prevent the subscriber from making further calls until his outstanding account is settled. Similarly, where a subscriber makes use of a top-up account, e.g. using scratch cards to credit his account, an operator can restrict the subscriber's access when the subscriber's credit drops to zero. Such charging control is possible because of the introduction into mobile networks of Intelligent Network (IN) nodes which use the so-called Intelligent Network Application Part (INAP) protocol to communicate with one another. Problems arise however when a mobile subscriber roams outside of his home network and registers with a foreign network. Charging mechanisms currently in use for roaming subscribers are slow and cumbersome, resulting in the barring of roaming services to certain classes of subscriber (e.g. pre-paid subscribers). Furthermore, whether a subscriber is at home or roaming "abroad", current charging mechanisms do not lend themselves to flexible charging schemes such as are desired by network operators.

In order to overcome the problems of existing charging mechanisms, a mechanism referred to as Customised Applications for Mobile network Enhanced Logic (CAMEL) has been standardised by ETSI (further enhancements to CAMEL are in the process of being standardised according to CAMEL phase 2 and phase 4). CAMEL provides for the transfer of charging related information in real time between a Service Control function (SCF) associated with a Cost Control Function (CCF) (the CCF is usually running at a Cost Control Node (CCN) located in a subscriber's home network) and a Service Switching Function (SSF) typically running at, or associated with, an MSC or GMSC (in the case of a GSM network) with which a subscriber to be charged is registered. The SSF may be located in the same network as the SCF or in a different network.

A feature of CAMEL is that it allows charging elements to be sent from an SCF/CCN to a SSF prior to and during a call involving a mobile terminal registered with an MSC/GMSC. A charging element defines a tariff for a call or part of a call or for some other service (e.g. data transfer), and may be used to calculate a charge. The charging element may be sent to a subscriber's terminal, e.g. according to the Advice Of Charge (AoC) service, by the SSF.

SUMMARY OF THE PRESENT INVENTION

The Advice of Charge (AoC) service is specified only for circuit switched calls. There is therefore a need for a new, AoC type service which supports packet switched calls and which is access and service independent. There is also a need for such a service with non-mobile terminals which make use of packet switched services.

According to a first aspect of the present invention there is provided a method of providing charge information to a subscriber terminal, which information relates to an IP connection or connections being used by the user, the method comprising the steps of:

identifying the terminal or the user to a charge control node (CCN) located in a home network of the terminal or subscriber; and for the duration of the IP connection(s), using the existing connection or one of the existing connections to transport a stream of charge information messages from the CCN to the subscriber terminal.

Using the present invention, charge information messages may be sent periodically to the subscriber terminal. Each message may contain, for example, the current balance of a pre-paid subscriber's account or the total charge incurred by a post-paid subscriber. Charge information relating specifically to the current IP connection(s), e.g. cost incurred so far and tariff data including cost per data block and the cost of accessing a specific web site, may also be included in the message. Charge information messages may also be sent to the terminal immediately following the addition of a one-off charge to a subscriber's account (e.g. where the charge relates to usage of a content-based service).

Preferably, said step of identifying the terminal or the subscriber to a CCN comprises sending identification data from the subscriber terminal to the CCN using the IP connection (or one of the IP connections). This step may be carried out automatically following the establishment of an IP connection. Where several IP connections exist simultaneously for the terminal, the charge information messages may contain charge information in respect of two (or more) of these IP connections.

In the case of a subscriber terminal which supports both packet switched and circuit switched calls (e.g. a GPRS class A mobile terminal), the charge information messages may additionally contain charge information relating to a current circuit switched call or call. The CCN is able to include all chargeable activities in the charge information messages due to a common user identity.

The method of the present invention may require the periodic sending of "continuation" messages from the subscriber terminal to the CCN over the IP connection. In the event that the sending of the continuation messages terminates, this is detected by the CCN and the sending of charge information messages to the subscriber terminal is halted.

It will be appreciated that the present invention provides an extremely flexible mechanism for providing charging information to subscriber terminals. In the case of mobile terminals, the invention can be used regardless of the location of the mobile terminal, i.e. regardless of whether the user is located within the coverage area of his home network or within that of a foreign network.

Preferably, the charges are calculated at the CCN on the basis of tariffs held at or accessible to the CCN, and charging data sent to the CCN from a switching node with which the terminal is registered. In the case of a GSM network incorporating GPRS, said node is a SGSN, and the charging data is sent to the CCN using the CAMEL Application Part (CAP) protocol. Charging data may be sent over an SS7 signalling network.

According to a second aspect of the present invention there is provided a charge control node (CCN) for use in a telecommunications network, the CCN being arranged to control charging for subscribers of the network and comprising:

means for authenticating a subscriber on the basis of identification information sent from the subscriber's terminal to the CCN; and means for generating a stream of charge information messages relating to an IP connection or connections established by the terminal, and for sending the generated messages to the terminal using the established connection or one of the established connections.

According to a third aspect of the present invention there is provided a subscriber terminal capable of establishing at least one IP connection via a telecommunications network, the terminal having:

means for identifying itself or a user to a charge control network of a home network of the user; and means for receiving a stream of charge control messages sent from the CCN using said IP connection, each charge control message containing charge information relating to the IP connection(s).

In one embodiment of the third aspect of the invention, the subscriber terminal is a mobile wireless terminal and said telecommunications network is a mobile telecommunications network.

DETAILED DESCRIPTION OF CERTAIN EMBODIMENTS

Figure 1:
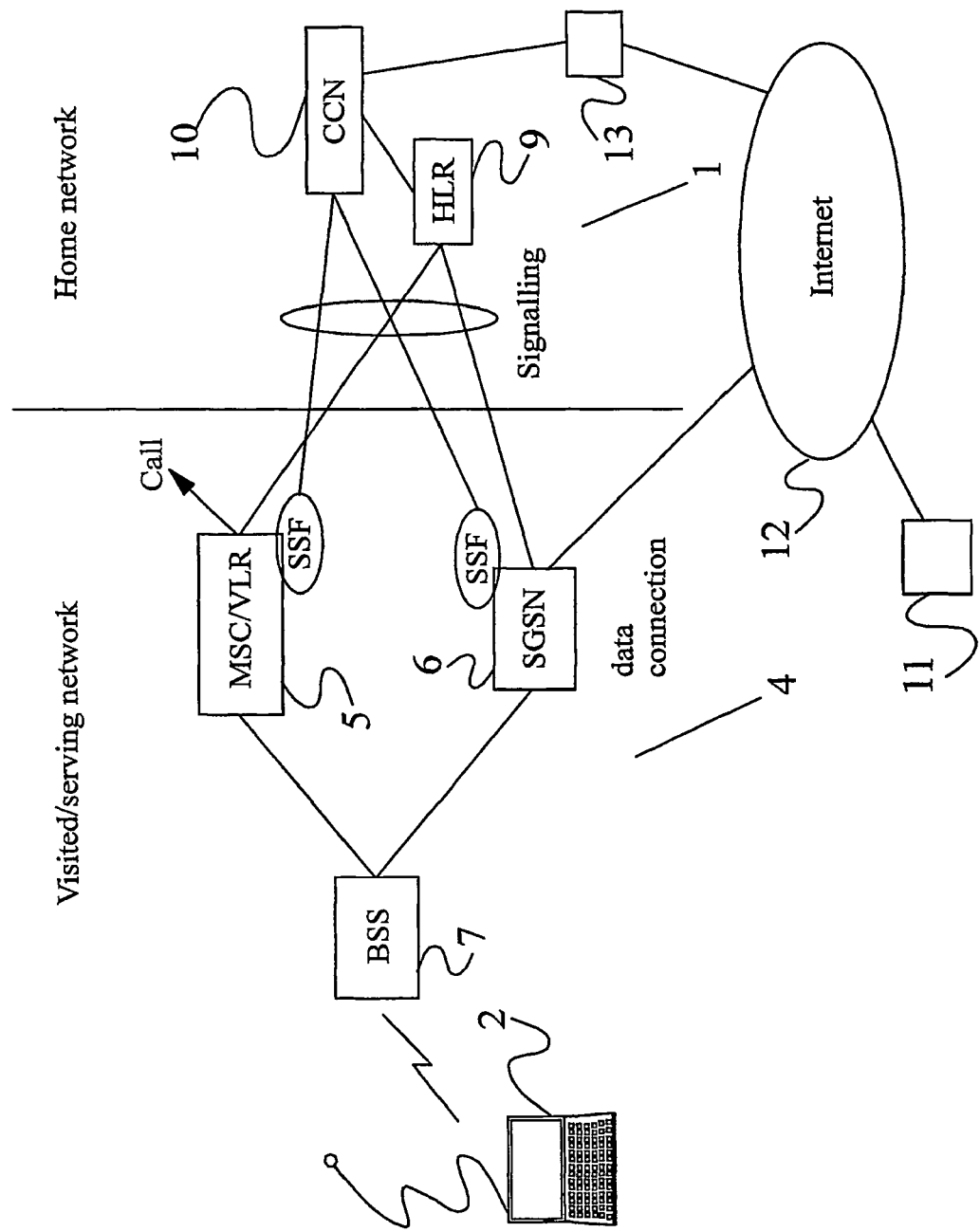
FIG. 1 illustrates a UMTS telecommunications system.

There is illustrated in FIG. 1 a telecommunications system comprising two interconnected Public Land Mobile Networks (PLMNs). For the purposes of the following illustration, a first of the PLMNs 1 represents the home network of a subscriber using a wireless data terminal 2, and is referred to as the Home PLMN (HPLMN). The second of the PLMNs 4 is referred to as the Visited PLMN (VPLMN). Only those nodes of the networks 1,4 relevant to the following discussion are illustrated in FIG. 1. Both of the networks 1,4 are Global System for Mobile communications (GSM) based networks and support GPRS. Illustrated in the VPLMN 4 are a Mobile Switching Centre (MSC) 5 (which is co-located with a Visitor Location Register (VLR)) and a Serving GPRS Support Node (SGSN) 6. The MSC and SGSN are responsible for connecting and routing voice and data calls respectively. The MSC/VLR 5 and the SGSN 6 are coupled in use to the wireless data terminal 2 via a Base Station Sub-system (BSS) 7. The networks 1,4 are coupled together via Gateway nodes although these are not illustrated in FIG. 1.

Illustrated in the HPLMN 1 is a Home Location Register (HLR) 9. The HLR 9 maintains a record of all of the subscribers of the HPLMN 1. A Service Control Function (SCF) is implemented at a Cost Control Node (CCN) 10 which, together with the HLR 9, forms part of a Home Subscriber System. For each subscriber, the CCN 10 records details of the tariff to which the subscriber subscribes. For example, a subscriber may subscribe to a "business tariff" which defines the cost of voice calls in terms of caller location, called party destination, duration, and time of day. The cost of data calls may also be defined using these same conditions, and additionally the volume of data sent to and/or received by the subscriber during a data call and the Quality of Service (QoS) involved.

In the event that the subscriber using the mobile terminal 2 roams outside of the coverage area of his HPLMN 1 and into the coverage area of the VPLMN 4, to facilitate voice calls his terminal 2 will seek to register with an MSC 5 of the VPLMN 4 after the MSC 5 has determined that the subscriber is a subscriber of a foreign network and has not already been registered in the associated VLR. For a subscriber registered with the MSC 5, the SSF located at the MSC is able to communicate with the CCN 10 to exchange charging related information. Information received by the SSF can be made available to the terminal 2 of the subscriber using the known AoC service.

If the subscriber wishes to make use of a GPRS data service, the terminal 2 must register with the SGSN 6. He may then establish an IP connection to a remote host 11 via the Internet 12. As already described, the AoC mechanism is limited to circuit switched calls and cannot be applied to packet switched calls. It is therefore proposed to establish an IP connection between the subscriber terminal 2 and the CCN 10 to exchange charging information. This IP connection makes use of the bearer set up to carry the existing IP connection (and the IP address already allocated to the terminal 2). There is therefore no need for a further prolonged setup phase. As is illustrated in FIG. 1, the CCN 10 is coupled to the Internet 12 via an IP gateway node 13.

The terminal 2 supports the JAVA Virtual Machine, and charge control software is provided in this language at the terminal 2. The charge information delivery mechanism uses JAVA. Th advantage of using Java is that the software can be downloaded into any terminal, and it is not necessary to standardise a new protocol. However, it will be understood that alternatives to Java exist.

Immediately following the establishment of the IP bearer and the allocation of an IP address to the terminal 2, the terminal contacts the CCN 10 over the Internet and authenticates itself to the CCN 10 (authentication may require the sending of the subscriber's IMSI, E.164 number, user id, or account number). The CCN 10 also authenticates itself to the terminal 2. This process may make use of, for example, IPSec. IPSec can also be used to generate a secure communication "channel" between the CCN 10 and the terminal 2.

Using the CAMEL Application Part (CAP), the SSF associated with the terminal 2 is able to send cost information to the CCN 10 via the SS7 signalling network. This information may include transferred data volume, connection time and the like, and allows the CCN 10 to compute charges for the subscriber based upon the appropriate tariffs.

Figure 2:
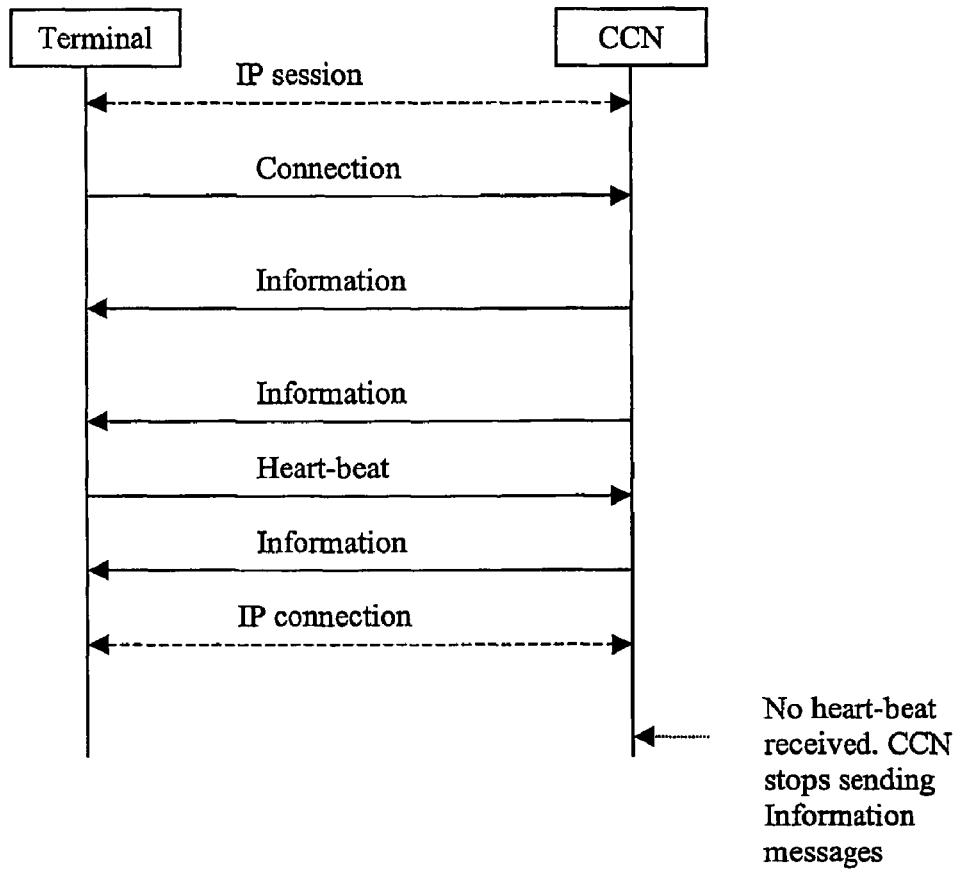
FIG. 2 illustrates signalling information sent between a charge control node and a mobile terminal in the network of FIG. 1.

FIG. 2 illustrates the protocol which is used to exchange charge information between the terminal 2 and the CCN 10. Following the establishment of the initial IP connection, and the establishment of a connection between the terminal and the CCN, charge information is sent from the CCN to the terminal as a real time stream of messages (IP datagrams). In order to maintain the flow of information to the terminal, the terminal must send "heartbeat" or continuation messages to the CCN at regular intervals. These messages identify the termiinal 2, and indicate to the CCN 10 that the terminal 2 is continuing to use the IP connection. Following the termination of the IP connection, the sending of heartbeat messages to the CCN 10 ceases, and the flow of charge information consequentially stops.

During an IP connection, the terminal 2 may send certain additional charging information to the CCN 10 in order to allow the CCN to calculate charges. This information may include details of particular web sites accessed.

It will be appreciated by the person of skill in the art that various modifications may be made to the above described embodiments without departing from the scope of the invention. For example, rather than send charge information between the mobile terminal and the CCN over the open Internet, a more secure approach might be to use a separate "closed" IP network (i.e. an IP backbone) owned and controlled by the operator(s) of the mobile network. In another modification, a subscriber may be able to request charge information from the CCN 10 by sending a request message to the CCN over the IP connection. This may be desirable if the interval between the "normal" information messages is too long for the subscriber.

The invention claimed is:

1. A method of providing charge information to a subscriber terminal communicating through a Home Public Land Mobile Network (HPLMN) associated with said subscriber terminal or a Visited Public Land Mobile Network (VPLMN), which information relates to an IP connection to said subscriber terminal, the method comprising the steps of:
   identifying the subscriber terminal to a charge control node (CCN) located in said HPLMN associated with said subscriber terminal;
   for the duration of the IP connection, using said IP connection to transport a stream of charge information messages directly from the CCN to the subscriber terminal, said charge control messages bypassing all circuit-switched control nodes of said HPLMN and said VPLMN to deliver said charge information to said subscriber terminal; and,
   periodically sending continuation messages from the subscriber terminal to the CCN over the IP connection in order to maintain said stream of charge information messages.

2. A method according to claim 1, wherein each of said charge information messages contains the user's current account balance.

3. A method according to claim 1, wherein said step of identifying the terminal or the user to a CCN comprises sending identification data from the terminal to the CCN using the IP connection.

4. A method according to claim 3, wherein said step of identifying the terminal or the subscriber to a CCN is carried out automatically following the establishment of an IP connection.

5. A method according to claim 1, wherein charges are calculated at the CCN on the basis of tariffs held at or accessible to the CCN, and charging data sent to the CCN from a switching node with which the subscriber terminal is registered.

6. A method according to claim 5, wherein the terminal is a mobile terminal and the IP connection is established over a GSM network incorporating GPRS and said switching node being a SGSN, the charging data being sent to the CCN using the CAMEL Application Part (CAP) protocol.

7. A charge control node (CCN) for use in a telecommunications network, the CCN being arranged to provide charge information to a subscriber terminal communicating through a Home Public Land Mobile Network (HPLMN) associated with said subscriber terminal or a Visited Public Land Mobile Network (VPLMN), said CCN located in said HPLMN associated with said subscriber terminal, said CCN comprising:
   means for authenticating said subscriber terminal on the basis of identification information sent to the CCN; and,
   means for generating a stream of charge information messages relating to an IP connection established by the subscriber terminal, and for sending the generated messages directly to the subscriber terminal using the IP connection, said charge control messages bypassing all circuit-switched control nodes of said HPLMN and said VPLMN to deliver said charge information to said subscriber terminal; and,
   means for periodically receiving continuation messages from the subscriber terminal over the IP connection, said stream of charge information messages being terminated if a continuation message is not periodically received within a predetermined period of time.

8. A subscriber terminal configured to receive charge information from a Home Public Land Mobile Network (HPLMN), said subscriber terminal comprising: establishing at least one IP connection via a telecommunications network
   means for identifying itself to a charge control node (CCN) located in a Home Public Land Mobile Network (HPLMN) associated with said subscriber terminal while said subscriber terminal is communicating through said HPLMN or a Visited Public Land Mobile Network (VPLMN);
   means for receiving a stream of charge control messages sent directly from the CCN using said IP connection, each charge control message containing charge information relating to the IP connection, said charge control messages bypassing all circuit-switched control nodes of said HPLMN and said VPLMN to deliver said charge information to said subscriber terminal; and,
   means for periodically sending continuation messages from the subscriber terminal to the CCN over the IP connection in order to maintain said stream of charge information messages.

9. A system for providing packet-switched charging information to a subscriber terminal communicating through a Home Public Land Mobile Network (HPLMN) associated with said subscriber terminal or a Visited Public Land Mobile Network (VPLMN), said charging information related to an IP connection to said subscriber terminal, said system comprising:
   means for identifying said subscriber terminal to a charging control node (CCN) located within said HPLMN associated with said subscriber terminal; means for communicating a stream of charge information messages directly from the CCN to the subscriber terminal during the duration of said IP connection, said charge control messages bypassing all circuit-switched control nodes of said HPLMN and said VPLMN to deliver said charge information to said subscriber terminal; and,
   means for periodically receiving continuation messages from the subscriber terminal to the CCN over the IP connection in order to maintain said stream of charge information messages.

10. The system of claim 9, wherein said IP connection utilizes a bearer set up to carry the charge information.

11. The system of claim 9, wherein means for identifying said subscriber terminal to said CCN comprises the means for sending identification data associated with said subscriber terminal to said CCN.

12. The system of claim 11, wherein said identification data comprises IMSI or E.164 number identifying said subscriber terminal.

13. The system of claim 9, wherein charges are calculated at the CCN on the basis of tariffs held at or accessible to the CCN, and charging data sent to the CCN from a switching node serving said mobile terminal.

14. The system of claim 13, wherein said subscriber terminal is a mobile terminal and said IP connection is established over a Global System for Mobile Communications (GSM) network incorporating General Packet Radio Service (GPRS) and said switching node is a Serving GPRS Support Node (SGSN), wherein the charging data is sent to the CCN using a CAMEL Application Part (CAP) protocol.

* * * * *